(12) United States Patent
Cawley et al.

(10) Patent No.: US 7,887,108 B1
(45) Date of Patent: Feb. 15, 2011

(54) ADJUSTABLE TINE CLAMP SYSTEMS AND METHODS

(75) Inventors: Clifton M. Cawley, Nederland, TX (US); Timothy W. Stephens, Beaumont, TX (US)

(73) Assignee: Sage Automation, Inc., Beaumont, TX (US)

(*) Notice: Subject to any disclaimer, the term of this patent is extended or adjusted under 35 U.S.C. 154(b) by 721 days.

(21) Appl. No.: 11/840,082

(22) Filed: Aug. 16, 2007

(51) Int. Cl.
*B25J 15/00* (2006.01)

(52) U.S. Cl. .......................... 294/2; 294/86.4; 294/106; 414/731

(58) Field of Classification Search .................. 294/2, 294/3, 86.4, 106–109, 115, 67.22; 414/731; 901/36, 39
See application file for complete search history.

(56) References Cited

U.S. PATENT DOCUMENTS

| | | | | | |
|---|---|---|---|---|---|
| 2,390,293 | A | * | 12/1945 | Colson | 294/86.41 |
| 3,322,455 | A | * | 5/1967 | Gressbach | 294/104 |
| 4,261,609 | A | * | 4/1981 | Kraszewski et al. | 294/119.1 |
| 4,360,110 | A | * | 11/1982 | Sigman et al. | 212/318 |
| 4,368,913 | A | * | 1/1983 | Brockmann et al. | 294/106 |
| 4,456,293 | A | | 6/1984 | Panissidi | |
| 4,621,852 | A | | 11/1986 | Maki et al. | |
| 4,632,444 | A | | 12/1986 | Martinez et al. | |
| 4,676,542 | A | | 6/1987 | Besold et al. | |
| 4,697,839 | A | | 10/1987 | Fischer | |
| 5,088,783 | A | * | 2/1992 | Squires | 294/81.54 |
| 5,664,931 | A | | 9/1997 | Brugger et al. | |
| 6,305,728 | B1 | | 10/2001 | Holter et al. | |

* cited by examiner

*Primary Examiner*—Dean J Kramer
(74) *Attorney, Agent, or Firm*—Fulbright & Jaworski L.L.P.

(57) ABSTRACT

Systems and methods which provide an adjustable tine clamp configuration are shown. Embodiments provide an adjustable support member configuration which is adapted to maintain a desired geometry of tines throughout an adjustable range. The adjustable support members are preferably adjustable to provide selectable clamping widths, such as to accommodate manipulation of goods of different sizes and shapes. Embodiments utilize parallel links coupled to pivoting tine supports to maintain proper tine geometry throughout the full range of adjustment. Such parallel links are further preferably utilized to actuate associated tines in operation of the adjustable tine clamp. Embodiments further implement a short stroke actuator configuration to facilitate very rapid production cycles.

15 Claims, 13 Drawing Sheets

ADJUSTABLE TINE CLAMP SYSTEMS AND METHODS

TECHNICAL FIELD

The present invention relates generally to automated handling of goods and, more particularly, to adjustable tine clamp systems and methods.

BACKGROUND OF THE INVENTION

A wide variety of goods are handled, such as during manufacturing or processing, by automated means. Such goods may include any number of different configurations having various sizes and shapes. For example, bags of different sizes, shapes, compositions, and external marking characteristics are used in various industries to encapsulate loose product so that the product can be efficiently consolidated, transported, distributed, and marketed. These bags are often manufactured and processed by automated means, such as to cut flattened tubes of appropriate lengths, seal an end or ends to form a bag or close a filled bag using stitching or adhesive, print information and other markings on a surface thereof, stack and pallet of the finished, unfilled bags, filling the bags with product, etc. Accordingly, handling of goods, such as the aforementioned bags, may include operations such as justifying edges of goods in a stack, clamping or compressing goods in a stack, moving one or more goods between processing stations, orienting one or more goods, etc. using robotic manipulators.

Figure 1A:
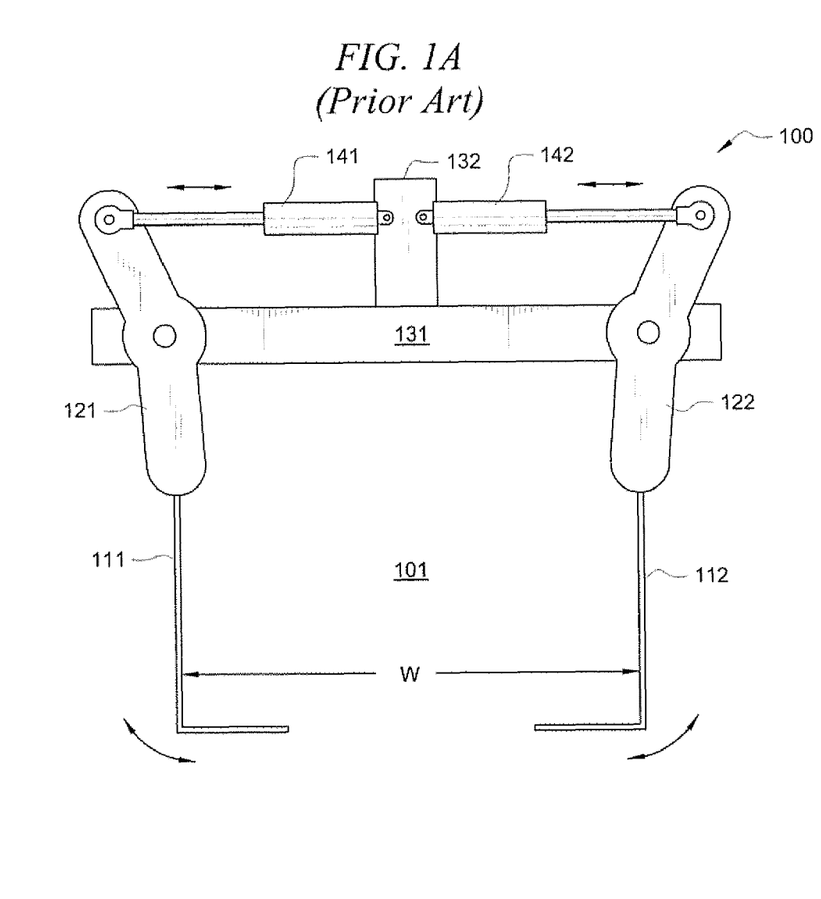
FIGS. 1A and 1B show an exemplary prior art basket tine clamp embodiment.
Figure 1B:
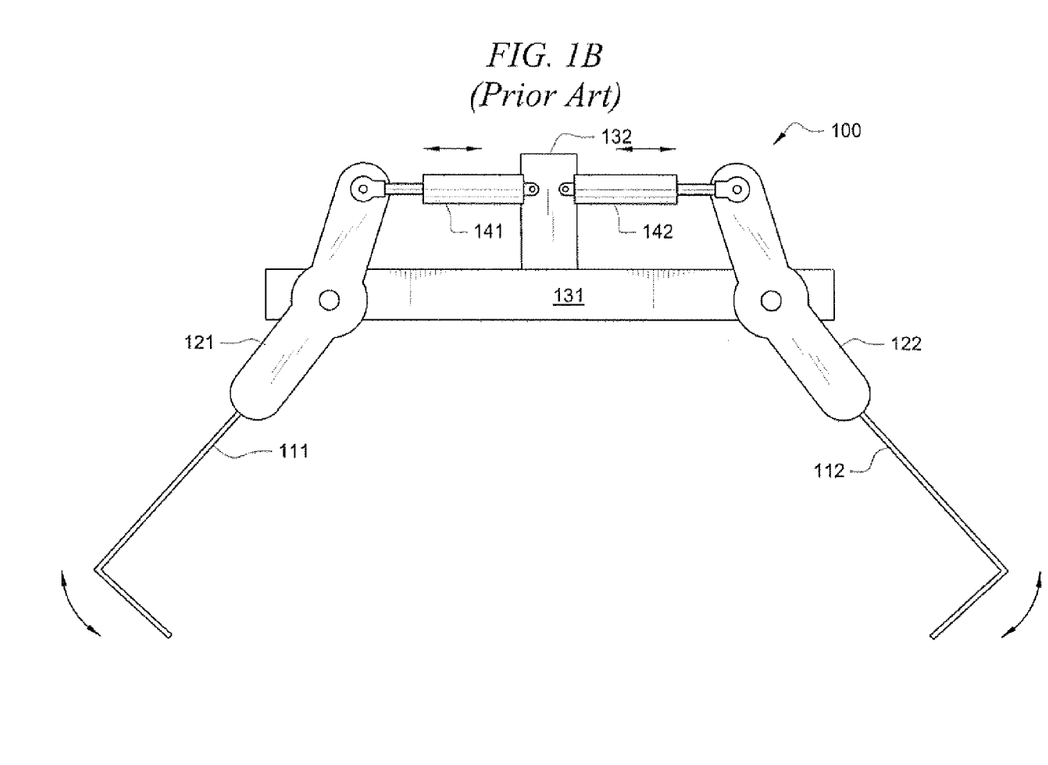

A basket tine clamp robotic manipulator is sometimes used in the automated manufacturing and processing of goods. FIGS. 1A and 1B illustrate, in highly simplified fashion, the operation of a typical prior art basket tine clamp. Basket tine clamp 100 shown in FIGS. 1A and 1B may be disposed on the end of a robotic arm member (not shown) to provide an interface with goods, while the robotic arm member is controlled to move basket tine clamp 100 and any goods disposed within basket area 101. Accordingly, basket tine clamp 100 includes angled tines 111 and 112 for engaging and incarcerating goods for robotic handling operations, such as moving goods between processing stations. Although only 2 angled tines are shown in FIGS. 1A and 1B, it should be appreciated that a plurality of angled tines may be included on both the left and right sides of basket tine clamp 100 (e.g., a series of angled tines disposed behind angled tines 111 and 112 along an axis extending into the paper) to form a three-dimensional basket area.

Angled tines 111 and 112 of FIGS. 1A and 1B are disposed on pivot members 121 and 122 respectively. Pivot members 121 and 122 are coupled to support member 131, providing pivot points about which pivot members 121 and 122 rotate. Additionally, pivot members 121 and 122 are coupled to a respective one of linear actuators 141 and 142, providing movement forces to pivot members 121 and 122. Linear actuators are coupled to brace 132, which itself is coupled to support member 131.

In operation, linear actuators 141 and 142 are operated to extend and retract. Because the proximal ends of linear actuators 141 and 142 are coupled to brace 132, providing rigid support of the actuators with respect to support member 131, distal ends of linear actuators 141 and 142 impart translational forces on upper ends of pivot members 121 and 122. With pivot members 121 and 122 coupled to support member 131 through respective pivot points, lower ends of pivot members 121 and 122, and correspondingly angled tines 111 and 112, are provided rotational movement in accordance with the actuator induced movement of the upper ends of pivot members 121 and 122. As shown in FIG. 1B, when linear actuators 141 and 142 are retracted, angled tines 111 and 112 are disposed such that basket tine clamp 100 is in an open position (e.g., no goods are engaged and/or incarcerated by basket tine clamp 100). However, when linear actuators 141 and 142 are extended, angled tines 111 and 112 are disposed such that basket tine clamp 100 is in a closed position forming basket area 101 (e.g., goods may be engaged and/or incarcerated by basket tine clamp 100, such as for moving the goods between processing stations).

The configuration illustrated in FIGS. 1A and 1B implement separate linear actuators to manipulate the tines of opposing sides of the basket tine clamp. Such a configuration is problematic in that if the movement of the actuators, and thus the movement of the tines, is not synchronized the goods may be mishandled. For example, angled tines 111 operating out of synchronization of angled tines 112 may cause goods disposed in basket area 101 to move left or right, thereby resulting in misplacement of the goods by the robotic actuator. Such inaccurate placement of goods can result in damage to the goods, unorganized or unstable stacking of goods, etc. Accordingly, in the configuration illustrated in FIGS. 1A and 1B, linear actuators 141 and 142 would need to be closely matched (e.g., provide substantially the same extension/retraction rate and stroke) as well as being controlled to operate in synchronization.

It can be readily appreciated from the configurations illustrated in FIGS. 1A and 1B that various sizes and shapes of goods are not easily accommodated by basket tine clamp 100. For example, basket area 101 defined by angled tines 111 and 112 has a fixed width dimension (W) defined at least in part by the location of the pivot points on support member 131. However, many goods have a side width that does not correspond to the foregoing basket area width dimension. If such goods were attempted to be manipulated by basket tine clamp 100, such handling would likely result in the failure to adequately incarcerate the goods during movement or processing, damage to the goods by basket tine clamp 100, etc.

Although the foregoing width dimension might appear to be alterable through controlled rotational movement of pivot members 121 and 122, in practice that is not the case. In particular, if pivot members 121 and 122 are under/over rotated in an attempt to alter the working width of basket area 101, angled tines 111 and 112 will no longer be in the proper geometry to engage and/or incarcerate goods. That is, the lower portion of angled tines 111 and 112 will no longer be oriented parallel to support member 131 when engaging or incarcerating goods. Such a situation can lead to failure to adequately incarcerate the goods during movement or processing, damage to the goods by basket tine clamp 100, etc.

Moreover, adjustment of the relative positions of the pivot points used by pivot members 121 and 122 to alter the foregoing width dimension is problematic. For example, even ignoring the difficulties associated with relocating each pivot member's pivot point on support member 131, additional alterations of basket tine clamp 100 would likely be required, such as to make corresponding adjustments with respect to linear actuators 141 and 142. Accordingly, it is not uncommon for different robotic manipulators to be required for handling different goods.

Although not shown in FIGS. 1A and 1B, basket tine clamp 100 may include additional tines (not shown), such as straight tines used for justifying edges of a stack of goods prior to angled tines 111 and 112 engaging the goods. These additional tines would, similar to the angled tines discussed above, require adjustment to accommodate an altered basket area width, thus further restricting the ability of basket tine clamp 100 to accommodate goods of different sizes and shapes.

It is often desirable for manufacturing or other processing operations to be performed at relatively high speeds in order to reduce handling times and costs. However, the long stroke of linear actuators 141 and 142 typically require appreciable time to complete a cycle, and thus may not be suitable for use at higher speeds. Alternatively, linear actuators 141 and 142 may be driven rapidly to their extremes (e.g., fully extended and retracted without dampening the stroke) in order to facilitate higher speed operation. However, the present inventors have discovered that such operation results in premature failure of the actuators, and thus is less than an ideal solution for providing high speed operation.

Basket tine clamp 100 illustrated in FIGS. 1A and 1B is a highly simplified representation of prior art basket tine clamps. However, the basket tine clamps heretofore available generally have one or more of the foregoing disadvantages associated therewith. Accordingly, the discussion above is believed to be applicable to a wide variety of prior art basket tine clamps.

BRIEF SUMMARY OF THE INVENTION

The present invention is directed to systems and methods which provide an adjustable tine clamp configuration. Embodiments of the present invention provide an adjustable support member configuration which is adapted to maintain a desired geometry of tines (e.g., angled tines providing a basket type manipulator, straight tines providing a justification type manipulator, etc.) throughout an adjustable range of the adjustable tine clamp. Adjustable support members of the present invention are adjustable to provide selectable clamping widths, such as to accommodate manipulation of goods of different sizes and shapes.

Preferred embodiments of the present invention utilize parallel links coupled to pivoting tine supports to maintain proper tine geometry throughout the full range of adjustment. Such parallel links are further utilized to actuate associated tines, through movement of the pivoting tine supports, in operation of the adjustable tine clamp according to embodiments of the invention. Parallel links implemented according to embodiments of the invention are adapted to maintain synchronous tine operation, regardless of adjustment of the adjustable support members. Accordingly, through adjustment of adjustable support members, without requiring any corresponding adjustment to the tines, their supports, or actuators, embodiments of the present invention may be easily and quickly adjusted to accommodate goods of different sizes and shapes.

Embodiments of the present invention further implement a short stroke actuator configuration to facilitate very rapid production cycles (e.g., a pick operation performed every 3-5 seconds). A preferred embodiment of the invention utilizes a synchronizing crank coupled between a short stroke actuator and ones of the aforementioned parallel links in order to provide synchronized actuation of a plurality of tines with rapid cycle times. According to preferred embodiments of the invention, the synchronizing crank is disposed to rotate about an axis that is perpendicular to a rotational axis of tine supports to which the synchronizing crank is linked so as to provide a configuration in which accurate synchronization of tine movement is ensured. Mechanical stops may be implemented with respect to the synchronizing crank to facilitate rapid extension and/or retraction of the actuators without causing premature failure associated with the actuator reaching full stroke and relying upon the actuator head to provide a stop.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 2A:
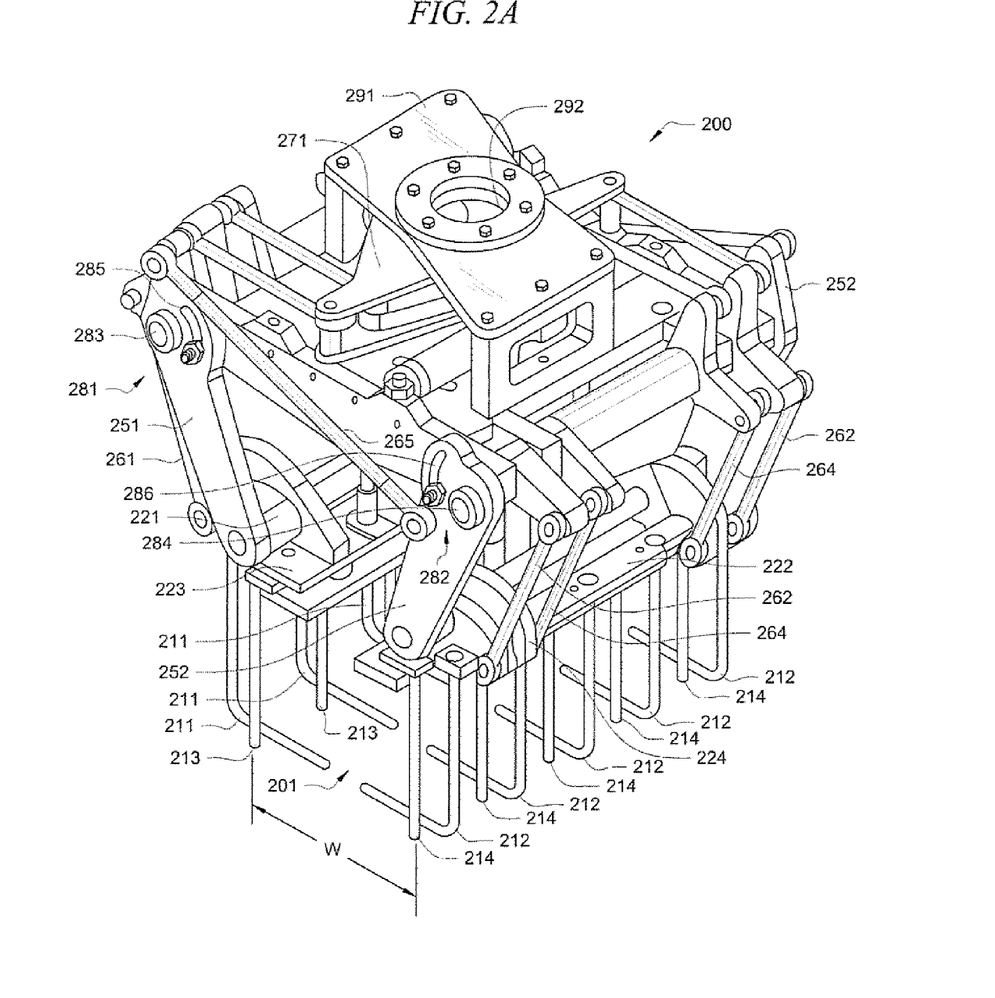
FIGS. 2A-2D show an adjustable basket tine clamp according to an embodiment of the invention.
Figure 2B:
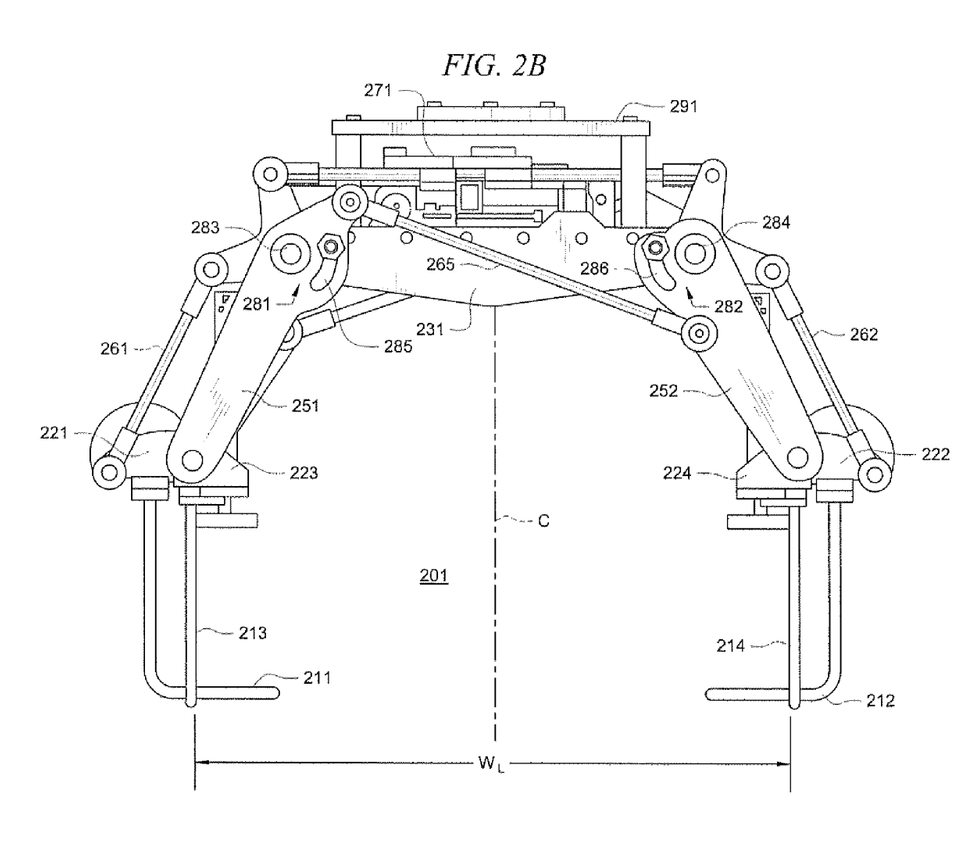
Figure 2C:
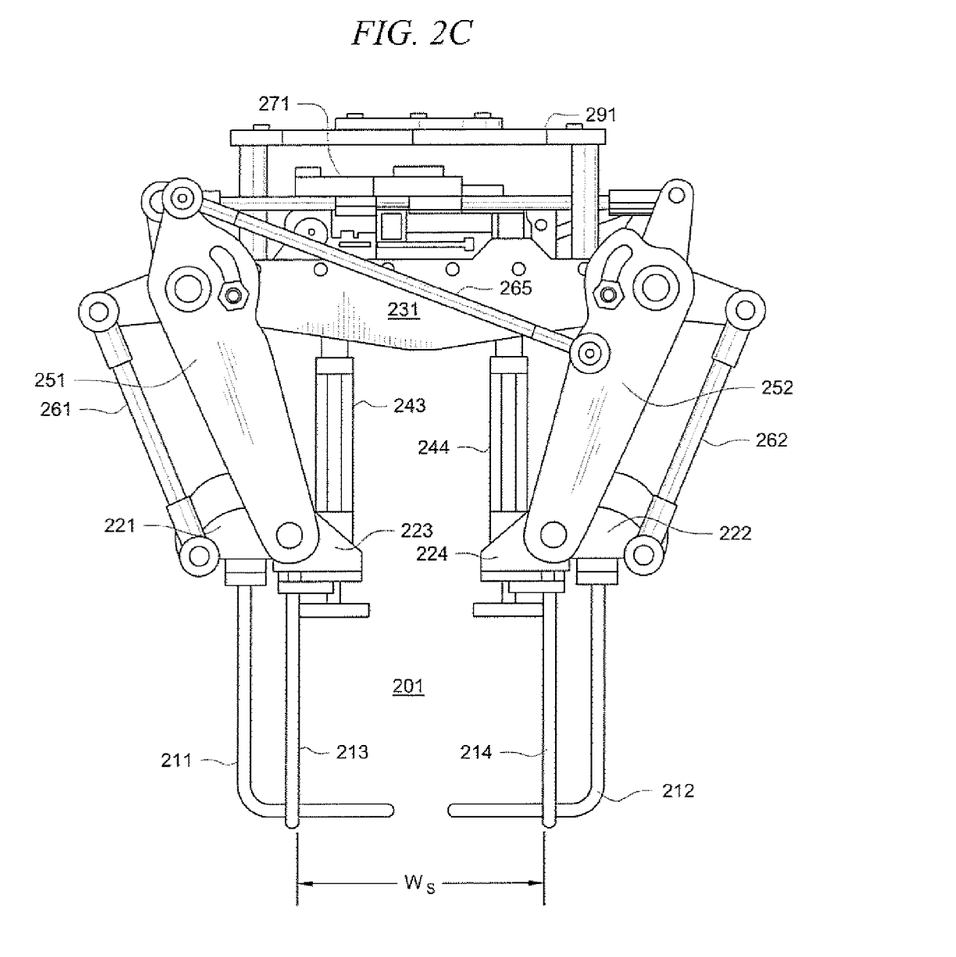
Figure 2D:
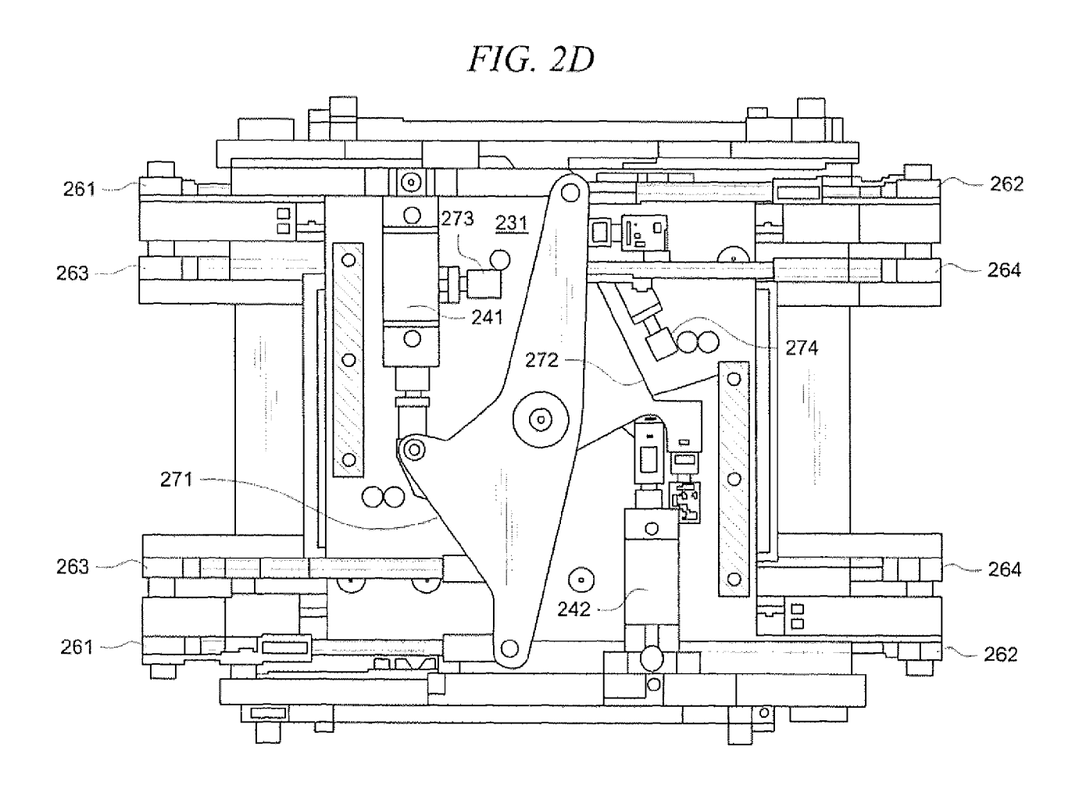

FIGS. 2A-2C show adjustable basket tine clamp 200 adapted to provide an adjustable tine clamp robotic manipulator according to an embodiment of the invention. Accordingly, adjustable basket tine clamp 200 as shown in FIG. 2A includes robotic arm attachment bracket 291 utilized for mounting adjustable basket tine clamp 200 on the end of a robotic arm member (not shown). Various control links (not shown), such as pneumatic lines, hydraulic lines, sensor and/or control electrical cables, etc., may be routed from a robotic control system via the robotic arm member, such as through bracket orifice 292, for coupling with components of adjustable basket tine clamp 200, such as actuators, sensors, etc.

Adjustable basket tine clamp 200 is preferably disposed on the end of a robotic arm member (not shown) to provide an interface with goods, while the robotic arm member is controlled to move adjustable basket tine clamp 200 and any goods disposed within basket area 201. Accordingly, adjustable basket tine clamp 200 includes angled tines 211 and 212 (e.g., "basket" tines) defining three-dimensional basket area 201 for engaging and incarcerating goods for robotic handling operations, such as moving goods between processing stations. It should be appreciated that embodiments of the invention may utilize a number of angled tines different than that of the illustrated embodiment.

Angled tines 211 and 212 are disposed on corresponding ones of pivoting tine supports 221 and 222. Pivoting tine supports 221 and 222 are pivotally coupled to respective ones of adjustable support members 251 and 252, providing pivot points about which pivoting tine supports 221 and 222 rotate. Additionally, pivoting tine supports 221 and 222 are coupled respective ones of parallel links 261 and 262 (parallel links 261 and 262 of the illustrated embodiment being parallel to a corresponding one of adjustable support members 251 and 252), which are themselves coupled to synchronizing crank 271 through corresponding bell crank and link assemblies. Linear actuator 241 provides movement forces to pivoting supports 221 and 222, and thus to angled tines 211 and 212, through synchronizing crank 271, parallel links 261 and 262, and the aforementioned bell crank and link assemblies. Linear actuator 241 is coupled to base 231, which itself is coupled to adjustable support members 251 and 252 through adjustment interfaces 281 and 282. Adjustment interface 281 of the illustrated embodiment includes pivotal attachment point 283 and adjustment slot 285, while adjustment interface 282 of the illustrated embodiment includes pivotal attachment point 284 and adjustment slot 286.

The embodiment of basket tine clamp 200 illustrated in FIGS. 2A-2D includes two sets of independently controllable tines. Accordingly, in addition to angled tines 211 and 212, basket tine clamp 200 includes straight tines 213 and 214 (e.g., "justify" tines). Straight tines 213 and 214 are preferably utilized to provide justifying of goods to be engaged and incarcerated by angled tines 211 and 212. It should be appreciated that embodiments of the invention may utilize a number of straight tines different than that of the illustrated embodiment.

Straight tines 213 and 214 are disposed on corresponding ones of pivoting tine supports 223 and 224. Pivoting tine supports 223 and 224 are pivotally coupled to respective ones of adjustable support members 251 and 252, providing pivot points about which pivoting tine supports 223 and 224 rotate. Additionally, pivoting tine supports 223 and 224 are coupled respective ones of parallel links 263 and 264, which are themselves coupled to synchronizing crank 272 through corresponding bell crank and link assemblies. Linear actuator 242 provides movement forces to pivoting supports 223 and 224, and thus to straight tines 213 and 214, through synchronizing crank 272, parallel links 263 and 264, and the aforementioned bell crank and link assemblies. Linear actuator 242 is coupled to base 231, which as discussed above is coupled to adjustable support members 251 and 252 through adjustment points 281 and 282.

The embodiment of basket tine clamp 200 illustrated in FIGS. 2A-2D further includes clamping actuators 243 and 244 to exert downward force upon goods disposed in basket area 201. According to a preferred embodiment, clamping actuators 243 and 244 are disposed on corresponding ones of pivoting tine supports 223 and 224.

In operation, linear actuators 241 and 242 as well as clamping actuators 243 and 244 are operated to extend and retract. Because the proximal end of linear actuator 241 is coupled to base 231, which in the illustrated embodiment provides support of the actuator wherein the actuator may pivot but further movement of the proximal end is restricted, distal end of linear actuator 241 imparts translational forces on synchronizing crank 271. The foregoing translational forces are transferred through the link and bell crank assemblies and parallel links 261 and 262 to pivoting tine supports 221 and 222. With pivoting tine supports 221 and 222 coupled to corresponding ones of adjustable support members 251 and 252 through respective pivot points, the pivoting tine supports, and correspondingly angled tines 211 and 212, are provided rotational movement in accordance with the actuator induced movement of synchronizing crank 271. Specifically, as shown in FIGS. 3A, 3B, 3E, and 3F for example, when linear actuator 241 is extended, angled tines 211 and 212 are disposed in an open position (e.g., no goods are engaged and/or incarcerated by angled tines 211 and 212 of adjustable basket tine clamp 200), However, as shown in FIGS. 2A-2D, 3C, and 3D, when linear actuator 241 is retracted, angled tines 211 and 212 are disposed in a closed position forming basket area 201 (e.g., goods may be engaged and/or incarcerated by angled tines 211 and 212 of adjustable basket tine clamp 200, such as for moving the goods between processing stations).

Figure 3A:
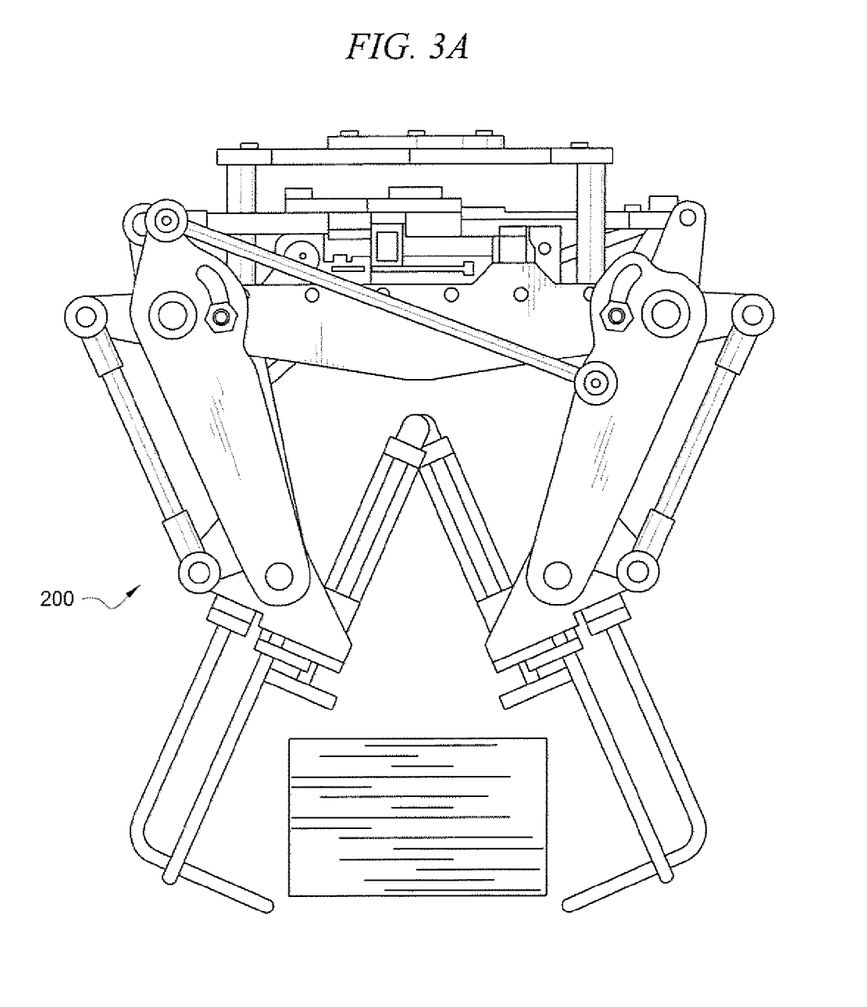
FIGS. 3A-3F show operation of the adjustable basket tine clamp of FIGS. 2A-2D through an exemplary operation cycle.
Figure 3B:
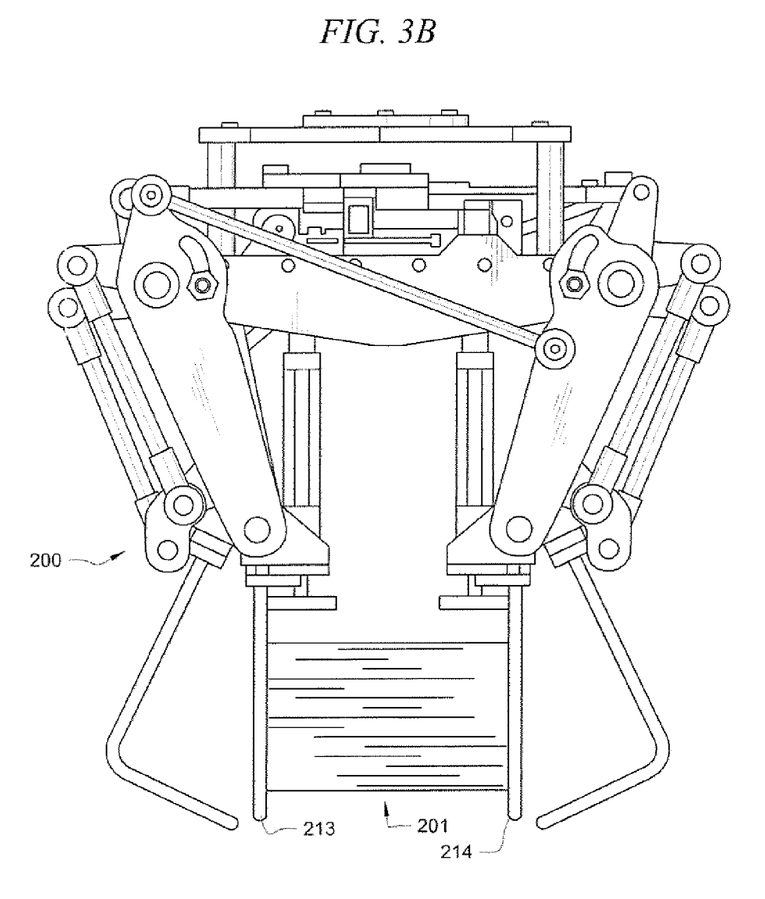
Figure 3C:
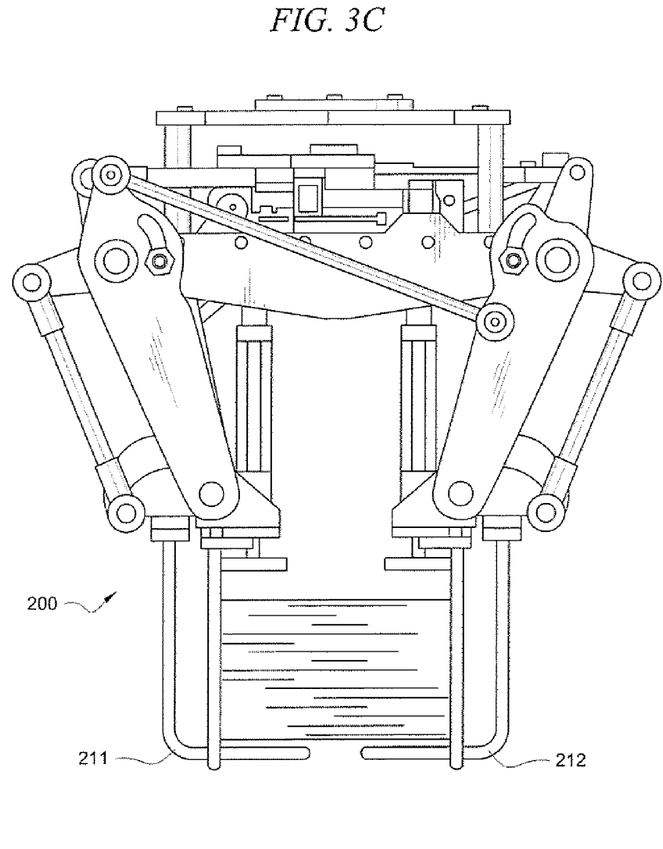

Similar to the operation of linear actuator 241 discussed above, because the proximal end of linear actuator 242 is coupled to base 231, which in the illustrated embodiment provides support of the actuator wherein the actuator may pivot but further movement of the proximal end is restricted, distal end of linear actuator 242 imparts translational forces on synchronizing crank 272. The foregoing translational forces are transferred through the link and bell crank assemblies and parallel links 263 and 264 to pivoting tine supports 223 and 224. With pivoting tine supports 223 and 224 coupled to corresponding ones of adjustable support members 251 and 252 through respective pivot points, the pivoting tine supports, and correspondingly straight tines 213 and 214, are provided rotational movement in accordance with the actuator induced movement of synchronizing crank 272. Specifically, as shown in FIGS. 3A and 3F for example, when linear actuator 242 is extended, straight tines 213 and 214 are disposed in an open position (e.g., no goods are engaged and/or incarcerated by straight tines 213 and 214 of adjustable basket tine clamp 200). However, as shown in FIGS. 2A-2D, 3B, 3C, 3D, and 3E, when linear actuator 242 is retracted, straight tines 213 and 214 are disposed in a closed position (e.g., goods may be engaged and/or incarcerated by straight tines 213 and 214 of adjustable basket tine clamp 200, such as for centering the goods within basket area 201 and/or to provide justifying of edges of goods).

Figure 3D:
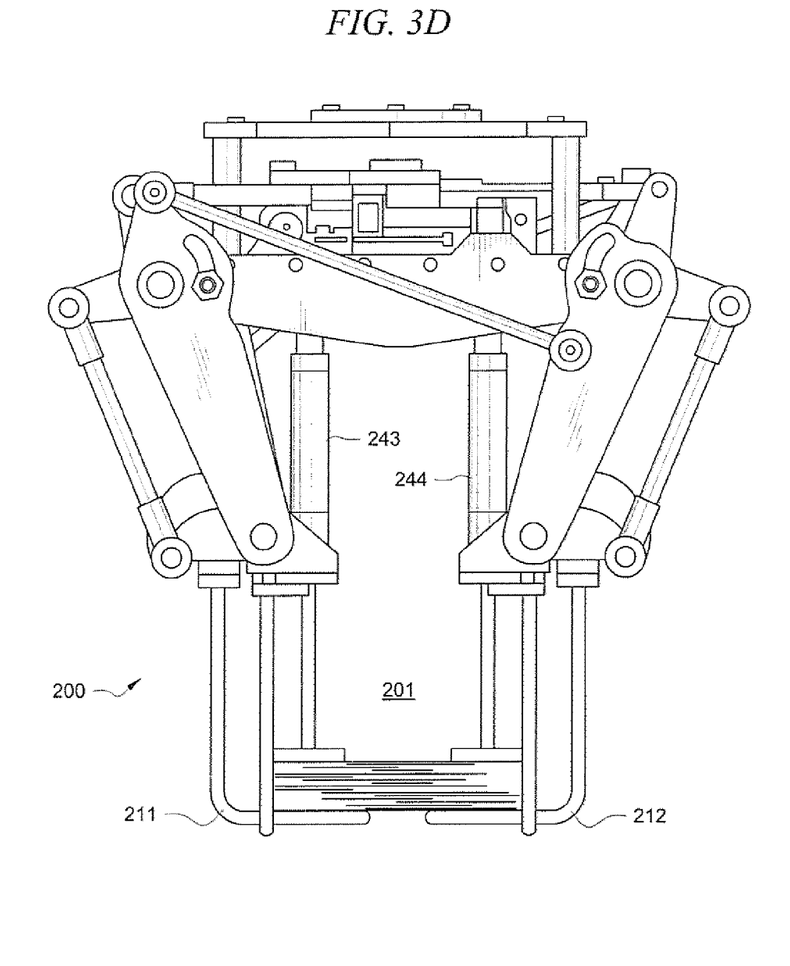
Figure 3E:
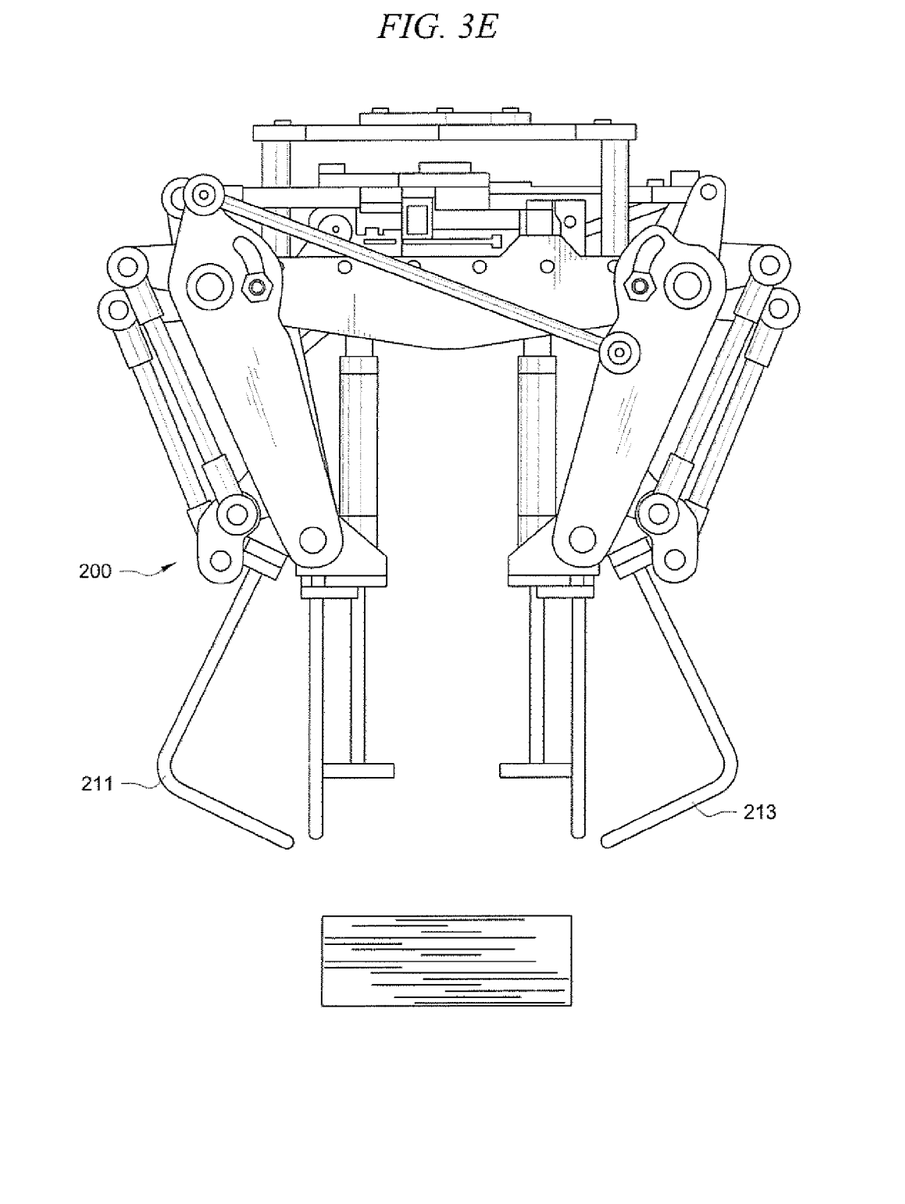
Figure 3F:
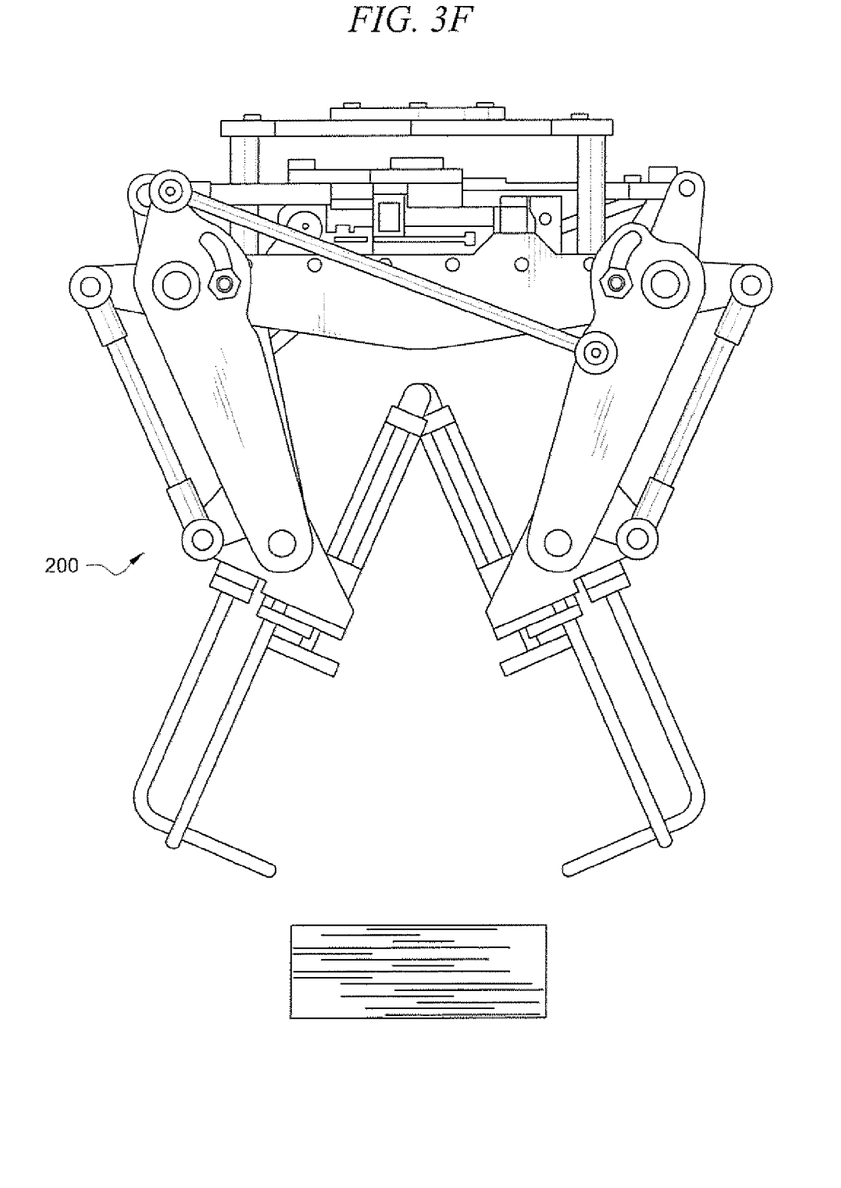

Clamping actuators 243 and 244 are preferably rigidly attached to respective ones of pivoting tine supports 223 and 224 such that operation of the clamping actuators causes clamping paddles thereof to extend into basket area 201, as shown in FIGS. 3D and 3E for example. Forces imparted by clamping paddles of clamping actuator s243 and 244 may be utilized to hold goods against angled tines 211 and 212 for movement between processing stations, to compress goods within basket area 201, to encourage ejection of goods from basket area 201, etc.

Having described the basic operating principals of the various components of adjustable basket tine clamp 200, a description of operation of these components through a typical clamping cycle will be provided with reference to FIGS. 3A-3F to aid in the understanding of adjustable basket tine clamp 200. In a typical clamping cycle, with adjustable basket clamp 200 in position over a stack of goods as shown in FIG. 3A, straight tines 213 and 214 will close as shown in FIG. 3B, centering the goods within basket area 201. Thereafter, angled tines 211 and 212 will close as shown in FIG. 3C, providing support for lifting the goods. Clamping actuators 243 and 244 will extend causing the clamping paddles to clamp the goods in position on angled tines 211 and 212 in basket area 201 as shown in FIG. 3D. Adjustable basket tine clamp 200, and thus the goods incarcerated within basket area 201, may then be moved to a desired "place" position through operation of a robotic arm member (not shown) upon which adjustable basket tine clamp 200 is disposed. When properly oriented with respect to the desired place position, angled tines 211 and 212 will open as shown in FIG. 3E allowing the goods to exit basket area 201, perhaps assisted by clamping actuators 243 and 244. As the goods exit basket area 201, straight tines 213 and 214 will preferably guide the goods until they have completely cleared adjustable basket tine clamp 200. Straight tin tines will open and clamping actuators will retract the clamping paddles to thus return adjustable basket tine clamp 200 to a ready condition as shown in FIG. 3F.

It should be appreciated that the illustrated embodiment of adjustable basket tine clamp 200 can readily be adjusted to accommodate various sizes and shapes of goods. Specifically, basket area 201 defined by angled tines 211 and 212 and/or straight tines 213 and 214 has an adjustable width dimension (W) defined at least in part by the configuration of adjustable support members 251 and 252. For example, as shown in FIG. 2B, adjustable support members 251 and 252 may be adjusted to provide a large width dimension ($W_L$) or, as shown in FIG. 2C, adjustable support members 251 and 252 may be adjusted to provide a small width dimension ($W_S$). Large width dimension ($W_L$) of embodiments may be 28 inches while small width dimension ($W_S$) may be 9 inches, for example. Accordingly, many goods having various side widths may be manipulated by adjustable basket tine clamp 200, after appropriate adjustment thereof, without resulting in the failure of adjustable basket tine clamp 200 adequately incarcerating the goods during movement or processing, damaging the goods by adjustable basket tine clamp 200, etc. Although only a large width dimension setting and a small width dimension setting are illustrated, it should be appreciated that the illustrated embodiment of adjustable basket tine clamp 200 provides for width setting adjustment throughout the range between large width dimension setting $W_L$ and small width dimension setting $W_S$.

To adjust adjustable basket tine clamp 200 of the illustrated embodiment, fasteners (e.g., screws, stud and nuts, cam-lock fasteners, etc.) disposed through adjustment slots 285 and 286 of adjustable support members 251 and 252 are loosened to allow pivotal movement of adjustable support members 251 and 252 about their respective pivot attachment points 283 and 284. Adjustable support members 251 and 252 may then be moved to any position up to and including the fastener abutting an upper or lower end of adjustment slots 285 and 286. It should be appreciated that link 265 is provided in the illustrated embodiment in order to maintain coordinated or synchronous adjustment of adjustable support members 251 and 252. When adjustable support members 251 and 252, and thus angled tines 211 and 212 and straight tines 213 and 214, are in their desired position (e.g., a desired basket width dimension ($W_D$) is achieved), the fasteners disposed through adjustment slots 285 and 286 of adjustable support members 251 and 252 may again be tightened to prevent undesired movement of adjustable support members 251 and 252.

Parallel links 261-264 of the illustrated embodiment operate to maintain the desired tine geometry throughout the full range of adjustment of adjustable basket tine clamp 200. To aid in the understanding of this feature of the illustrated embodiment, reference is made to an imaginary line extending through the center of basket area 201 perpendicular to crank 271. This imaginary line is shown as line C in FIG. 2B.

Parallel links 261 and 262 link respective ones of pivoting tine supports 221 and 222 to the corresponding bell cranks (tine supports 221 and 222 and their corresponding bell cranks having parallel pivot point axes) such that pivoting tine supports 221 and 222 remain in a particular orientation irrespective of an adjustment setting of adjustable support members 251 and 252. For example, assuming linear actuator 241 is in a retracted state, and thus tine supports 221 and 222 are disposed in a orientation which is perpendicular to line C (angled tines 211 and 212 are in a closed position), this perpendicular orientation would be maintained for any position of adjustable support members 251 and 252 ($W_S$ through $W_L$). From the above, it can be appreciated that angled tines 211 and 212 remain in a same geometry with respect to one another (e.g., mirrored juxtaposition about line C) throughout the adjustment range. It should be appreciated that linear actuator 241 in the foregoing example is not relied upon to maintain the particular orientation, but the state of linear actuator 241 is given above merely to provide a reference orientation for tine supports 221 and 222 (which are themselves movable about their respective pivot points) for the discussion.

Similarly, parallel links 263 and 264 link respective ones of pivoting tine supports 223 and 224 to the corresponding bell cranks (tine supports 263 and 264 and their corresponding bell cranks having parallel pivot point axes) such that pivoting tine supports 223 and 224 remain in a particular orientation irrespective of an adjustment setting of adjustable support members 251 and 252. For example, assuming linear actuator 242 is in a retracted state, and thus tine supports 223 and 224 are disposed in a orientation which is perpendicular to line C (straight tines 213 and 214 are in a closed position), this perpendicular orientation would be maintained for any position of adjustable support members 251 and 252 ($W_S$ through $W_L$). Accordingly, straight tines 213 and 214 remain in a same geometry with respect to one another (e.g., mirrored juxtaposition about line C) throughout the adjustment range. Moreover, in the illustrated embodiment, clamping actuators 243 and 244 are disposed upon pivoting tine supports 223 and 224 and thus are also provided adjustment as adjustable support members 251 and 252 are adjusted. As with the mention of linear actuator 241 above, it should be appreciated that linear actuator 242 in the foregoing example is not relied upon to maintain the particular orientation, but the state of linear actuator 242 is given above merely to provide a reference orientation for tine supports 223 and 224 (which are themselves movable about their respective pivot points) for the discussion.

Accordingly, by loosening the fasteners disposed through adjustment slots 285 and 286, adjusting adjustable support members 251 and 252, and again tightening the fasteners disposed through adjustment slots 285 and 286, and without the need to make any adjustments to the actuators, the linkages, etc., adjustable basket tine clamp 200 may be adjusted to accommodate a wide range of sizes and shapes of goods. The use of parallel links 261-264 and pivoting tine supports 221-224 for both actuation consistency (i.e., the same amount of travel is available during actuation regardless of the position of the adjustable support members) and geometric consistency (i.e., the tines remain in the same juxtaposed relationship regardless of the position of the adjustable support members), as shown in the illustrated embodiment, provides adjustable basket tine clamp 200 with the flexibility to readily handle a wide range of goods.

In addition to providing a large range of basket area width adjustments, adjustable basket tine clamp 200 of the illustrated embodiment is adapted to accommodate very rapid production cycles, such as on the order of 3-5 seconds. For example, the crank and linkage drive line coupling the actuators with the tines of the illustrated embodiment facilitates the use of short stroke linear actuators. Whereas longer stroke actuators inhibit cycle time, short stroke actuators, such as linear actuators 241 and 242, facilitate rapid cycle times. Short stroke actuators as used herein may be quantitatively described in various ways. For example, short stroke actuators of embodiments provide complete stroke extension or retraction in 0.5 second or less. Short stroke actuators of embodiments of the invention are those actuators where their stroke is sufficiently small so as to prevent the use of an internal stroke cushion mechanism (see U.S. Pat. Nos. 6,435,072, 6,490,961, and 6,038,956, the disclosures of which are hereby incorporated herein by reference, for examples of actuator cushion mechanisms) due to the stroke cushion mechanism's inability to provide discernable results and/or there being insufficient stroke to implement the stroke cushion mechanism.

Moreover, mechanical stops 273 and 274, such as may comprise fixed or adjustable rubber or electrometric bumpers, are provided to interface with a respective one of synchronizing cranks 271 and 272 to facilitate rapid extension of a corresponding one of actuators 241 and 242 while preventing full extension of the actuators such that a cylinder head and cap stop the piston movement. Thus, not only are rapid cycle times accommodated, but premature failure of the actuators is avoided according to embodiments of the invention.

Although an exemplary adjustable basket tine clamp configuration has been described above, it should be appreciated that concepts of the present invention apply to robotic actuator configurations different than the particular embodiment shown. Accordingly, various alternative configurations may be utilized in implementing the present invention.

For example, although linear actuators have been shown in the illustrated embodiment, various other actuator configurations may be used. Embodiments of the invention may utilize rotary actuators, servomotors, stepper motors, and/or the like.

Figure 4:
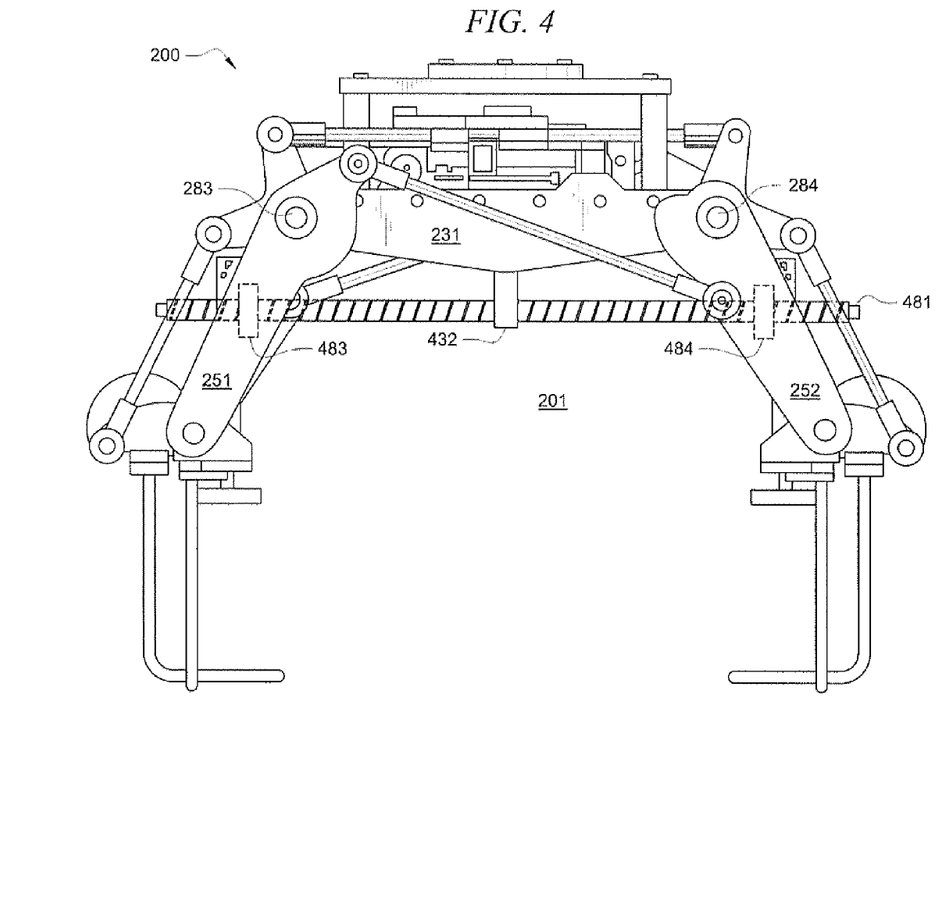
FIG. 4 shows an alternative embodiment of an adjustable basket tine clamp.

Additionally, rather than adjustment slots 285 and 286 having fasteners therethrough to provide for controlled adjustment of adjustable support members 251 and 252, embodiments of the invention may implement an acme screw configuration. Directing attention to FIG. 4, adjustable basket tine clamp 200 adapted to implement acme screw 481 for controlled adjustment of adjustable support members 251 and 252 is shown. Acme screw 481 of the illustrated embodiment includes both right-hand and left-hand screws to provide for corresponding, but opposite, movement of adjustable support members 251 and 252 when acme screw 481 is turned. Acme screw 481 of the illustrated embodiment is fixedly attached to base 231 through brace 432. Such fixed attachment preferably prevents longitudinal movement of acme screw 481 while allowing rotational movement of acme screw 481. Acme screw 481 of embodiments is coupled to adjustable support members 251 and 252 by respective ones of screw blocks 483 and 484. Screw blocks 483 and 484 of an embodiment are pivotally connected to a corresponding one of adjustable support member 251 and 252 so as to cause movement of adjustable support members 251 and 252 along the longitudinal axis of acme screw 481 as acme screw 481 is turned. Accordingly, a width of basket area 201 may be precisely adjusted through turning acme screw 481.

It should be appreciated that the concepts of the present invention are not limited to use with respect to basket tine clamp configurations. Concepts of the present invention may be applied to various robotic manipulators where adjustable juxtaposed components having a constant geometry throughout the adjustment range are desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for use as a robotic manipulator, said system comprising:
   a plurality of goods interface members disposed in a predetermined juxtaposed geometry, wherein said plurality of goods interface members comprises angled tines of a goods lifting mechanism and straight tines of a goods justifying mechanism; and
   a plurality of adjustable support assemblies providing physical support to said plurality of goods interface members, wherein said plurality of adjustable support assemblies are adapted to maintain said predetermined juxtaposed geometry of said plurality of goods interface members throughout an adjustment range, and wherein each adjustable support assembly of said plurality of adjustable support assemblies comprises:
      an adjustable support member;
      a pivoting goods interface member support member, said pivoting goods interface member support member being pivotally coupled to said adjustable support member; and
      a link coupled to said pivoting goods interface member support member, said link adapted to cause pivotal movement of said pivoting goods interface member support member during adjustment of said adjustable support member to maintain said predetermined juxtaposed geometry of said plurality of goods interface members throughout said adjustment range.

2. The system of claim 1, wherein said link is in communication with an actuator, said link further adapted to cause pivotal movement of said pivoting goods interface member support member during operation of said actuator.

3. A system for use as a robotic manipulator, said system comprising:
   a plurality of goods interface members disposed in a predetermined juxtaposed geometry, wherein said plurality of goods interface members comprises angled tines of a goods lifting mechanism and straight tines of a goods justifying mechanism;
   a plurality of adjustable support assemblies providing physical support to said plurality of goods interface members, wherein said plurality of adjustable support assemblies are adapted to maintain said predetermined juxtaposed geometry of said plurality of goods interface members throughout an adjustment range;
   a synchronization crank in communication with said plurality of adjustable support assemblies; and
   an actuator coupled to said synchronization crank and operable to provide clamping movement of said plurality of goods interface members.

4. The system of claim 3, wherein said actuator, said synchronization crank, and said plurality of adjustable support assemblies are adapted to provide cycle times of said robotic manipulator in the range of 3-5 seconds.

5. The system of claim 3, wherein said actuator comprises a short stroke linear actuator.

6. The system of claim 3, further comprising:
a mechanical stop adapted to interface with said synchronizing crank prior to said actuator reaching a fully extended state.

7. A method for providing adjustment of a robotic manipulator clamp assembly, said method comprising:
selecting a desired clamping width of said robotic manipulator clamp assembly;
adjusting a plurality of adjustable support assemblies to dispose a plurality of goods interface members to provide said desired clamping width, wherein said adjustable support assemblies include at least two adjustable support members and wherein said adjusting said plurality of adjustable support assemblies comprises: rotating said at least two adjustable support members about corresponding pivot points; loosening, prior to rotating said plurality of adjustable support assemblies, a fastener disposed through an adjustment slot of at least one adjustable support assemblies of said plurality of adjustable support assemblies to allow said rotating; and tightening, after said rotating said plurality of adjustable support assemblies, said fastener to prevent further said rotating; and
maintaining a predetermined juxtaposed geometry of said plurality of goods interface members throughout said adjusting said plurality of adjustable support assemblies.

8. The method of claim 7, wherein said adjusting said plurality of adjustable support assemblies further comprises:
turning an acme screw interfaced with at least two adjustable support assemblies of said plurality of adjustable support assemblies.

9. The method of claim 7, wherein said adjustable support assemblies include at least two pivoting goods interface member support members, and wherein said maintaining said predetermined juxtaposed geometry of said plurality of goods interface members comprises:
rotating said at least two pivoting goods interface member support member about corresponding pivot points.

10. An adjustable basket tine clamp comprising:
a plurality of basket tines disposed in a predetermined geometry to define a goods incarceration basket area when in a closed position and a goods release orientation when in an open position;
a first set of pivoting tine supports, wherein a first group of basket tines of said plurality of basket tines are disposed on a first pivoting tine support of said first set of pivoting tine supports, and wherein a second group of basket tines of said plurality of basket tines are disposed on a second pivoting tine support of said first set of pivoting tine supports;
at least two adjustable support members, wherein said first pivoting tine support is pivotally coupled to a first adjustable support member of said at least two adjustable support members, wherein said second pivoting tine support is pivotally coupled to a second adjustable support member of said at least two adjustable support members, and wherein each of said first adjustable support member and said second adjustable support member is pivotally coupled to a basket tine clamp base; and
a first set of links, wherein a first link of said first set of links is pivotally coupled to said first pivoting tine support and is further coupled to a first actuator assembly, and wherein a second link of said first set of links is pivotally coupled to said second pivoting tine support and is further coupled to said first actuator assembly, wherein said plurality of basket tines are maintained in said predetermined geometry throughout an adjustment range of said at least two adjustable support members through interaction of said at least two adjustable support members, said first set of pivoting tine supports, and said first set of links.

11. The adjustable basket tine clamp of claim 10, further comprising:
a plurality of justify tines disposed in a predetermined geometry to define a goods centering area when in a closed position and a goods release orientation when in an open position;
a second set of pivoting tine supports, wherein a first group of justify tines of said plurality of justify tines are disposed on a first pivoting tine support of said second set of pivoting tine supports, wherein a second group of justify tines of said plurality of justify tines are disposed on a second pivoting tine support of said second set of pivoting tine supports, wherein said first pivoting tine support of said second set is pivotally coupled to said first adjustable support member of said at least two adjustable support members, and wherein said second pivoting tine support of said second set is pivotally coupled to said second adjustable support member of said at least two adjustable support members;
a second set of links, wherein a first link of said second set of links is pivotally coupled to said first pivoting tine support of said second set and is further coupled to a second actuator assembly, and wherein a second link of said second set of links is pivotally coupled to said second pivoting tine support of said second set and is further coupled to said second actuator assembly, wherein said plurality of justify tines are maintained in said predetermined geometry throughout an adjustment range of said at least two adjustable support members through interaction of said at least two adjustable support members, said second set of pivoting tine supports, and said second set of links.

12. The adjustable basket tine clamp of claim 10, wherein said first actuator assembly comprises:
a linear actuator having a short stroke.

13. The adjustable basket tine clamp of claim 12, wherein said first actuator assembly further comprises:
a synchronization crank coupling said linear actuator to said first set of pivoting tine supports via said first set of links.

14. The adjustable basket tine clamp of claim 13, further comprising:
a mechanical stop adapted to interface with said synchronizing crank prior to said linear actuator reaching a fully extended state.

15. The adjustable basket tine clamp of claim 10, further comprising:
a plurality of clamping actuators, wherein said plurality of clamping actuators are disposed such that their position in said adjustable basket tine clamp is adjusted as said at least two adjustable support members are adjusted.

* * * * *